United States Patent [19]
Hensley et al.

[11] Patent Number: 5,775,158
[45] Date of Patent: Jul. 7, 1998

[54] CUTTING DIES

[75] Inventors: Lyman J. Hensley, Sycamore; Neil H. Strawbridge, Jr., Machesney Park; Donald L. Shaner, Rockford, all of Ill.

[73] Assignee: Greenlee Textron Inc., Rockford, Ill.

[21] Appl. No.: 685,135

[22] Filed: Jul. 23, 1996

[51] Int. Cl.$^6$ .................................................. B21D 28/00
[52] U.S. Cl. ................... 72/325; 72/416; 72/461; 30/92; 30/180; 30/228
[58] Field of Search ............... 72/325, 416, 461; 30/228, 180, 182, 210, 216, 92, 241

[56] References Cited

U.S. PATENT DOCUMENTS

| | | | |
|---|---|---|---|
| 1,075,439 | 10/1913 | Quinlin | 30/241 |
| 1,374,278 | 4/1921 | Burch | 30/92 |
| 1,663,189 | 3/1928 | Bergstrom | 30/92 |
| 2,367,654 | 1/1945 | Anderson | 72/325 |
| 2,686,362 | 8/1954 | Dancey | 30/92 |
| 2,823,454 | 2/1958 | Kirchner | 30/241 |
| 3,036,798 | 4/1962 | Martin | 30/180 |
| 3,175,289 | 3/1965 | Wilterdink | 30/180 |
| 3,301,035 | 1/1967 | Gill | 72/404 |
| 3,568,496 | 3/1971 | Burke | 72/404 |
| 4,198,748 | 4/1980 | Lewis | 30/180 |
| 4,779,502 | 10/1988 | Hebert | 30/228 |
| 5,421,186 | 6/1995 | Lefavour | 72/461 |

FOREIGN PATENT DOCUMENTS

| | | | |
|---|---|---|---|
| 224209 | 12/1984 | Japan | 72/325 |
| 205913 | 8/1989 | Japan | 30/92 |
| 139718 | 3/1953 | Sweden | 30/228 |

*Primary Examiner*—Daniel C. Crane
*Attorney, Agent, or Firm*—Trexler, Bushnell, Giangiorgi & Blackstone, Ltd.

[57] ABSTRACT

A die structure for use in a tool which crimps or cuts a workpiece between relatively moveable jaws of the tool on which the die structure is securable is particularly structured for durability when used to severe high tensile strength cable such as guy wire and other multi-strand cable. A pair of die structures in accordance with the invention each has a cutting edge formed on a die body, and in a preferred embodiment, the cutting edges have aligned engagement surfaces which are flat and elongate to provide a pinching action which fractures or severs the workpiece usually before the cutting surfaces meet. The flat cutting surfaces provide improved durability over sharp cutting edges, and are preferably heat treated to promote further durability in severe cutting surface. The die structure, installed preferably on the stationary tool jaw, also includes retaining structure secured on the die body adjacently spaced from the cutting edge and arranged to support the workpiece engageable thereagainst to prevent deformation or splaying of the workpiece at the supported position during severance by the cutting edge at adjacent location on the workpiece. In a preferred embodiment, the retaining structure includes a pair of spaced support walls laterally arranged on the die body relative to an intermediate position of the cutting edge. In another embodiment, one of the die bodies has a half-cylindrical cavity for reception of a workpiece, and is not provided with an impinging or cutting edge so that the diametrically opposed cylindrical cavity walls provide lateral support particularly of a multi-strand cable which prevent or minimize splaying thereof during impingement by a single cutting edge which projects, preferably an arcuate configuration, from the other die body.

32 Claims, 4 Drawing Sheets

CUTTING DIES

BACKGROUND

The present invention relates to cutting dies for use in powered compression or crimping tools, and particularly relates to dies for cutting high tensile strength cable, wire and soft steel rods with said portable compression or crimping tools.

Portable power tools for radially crimping cylindrical workpieces such as electrical terminals or connectors onto electrical cable or for cutting said conduit are widely used with replaceable crimping dies which are installed on and forced together by opposing jaws of the tool, as particularly described in U.S. Pat. Nos. 4,292,833 and 5,195,354. Manufacturers of such crimper tools have designed dies for use in cutting soft material such as copper and aluminum cable, however, these dies have proved unsatisfactory in cutting high tensile strength material such as guy wire and steel reinforced cable or soft steel rods. Furthermore, the existing cutting dies for soft copper and aluminum cable are unable to efficiently cut multi-strand cable, especially cable without insulation, due to the initial impact of the dies causing the multi-strand bundle to splay or yield in a spreading deformation so that the dies become overloaded in attempting to cut many, if not most, of the strands of the resulting splayed, multi-strand cable as discussed more fully hereinafter with regard to the drawing.

These and other disadvantages are eliminated by cutting die structures in accordance with the present invention.

SUMMARY OF THE INVENTION

In accordance with the present invention, a die structure for use in a tool which crimps or cuts a workpiece between relatively moveable jaws of the tool on which the die structure is secured or mounted is particularly structured for durability when used to sever high tensile strength cable such as guy wire as well as other multi-strand cable. A pair of die structures in accordance with the invention each has a cutting edge formed on a die body, and in a preferred embodiment, the cutting edges have aligned lead surfaces which are truncated flat to provide durability and a pinching action which fractures or severs the workpiece usually before the opposed surfaces engage. The flat cutting surfaces provide improved durability over sharp cutting edges, and are preferably heat treated to promote further durability under severe cutting conditions.

The die structure, installed preferably on the stationary tool jaw, also includes retaining structure secured on the die body adjacently spaced from the cutting edge and arranged to support the workpiece engageable thereagainst to prevent deformation or splaying of the multi-stranded workpiece at the supported position during impingement and deformation by the cutting edge at adjacent location on the workpiece.

In a preferred embodiment, the retaining structure includes a pair of spaced support walls laterally arranged on the die body relative to an intermediate position of the cutting edge. The pair of lateral support walls provide particular support to prevent spreading or splaying of multi-strand cable, and maintain the cable configuration to some extent during cutting. The support walls could be removably bolted or otherwise fastened to the die body with split rings or other deformable spacers between the support wall and the die body to enable shock-absorbing deflectability of the support wall in high load cutting operation.

DESCRIPTION OF THE PREFERRED EMBODIMENTS

Figure 1:
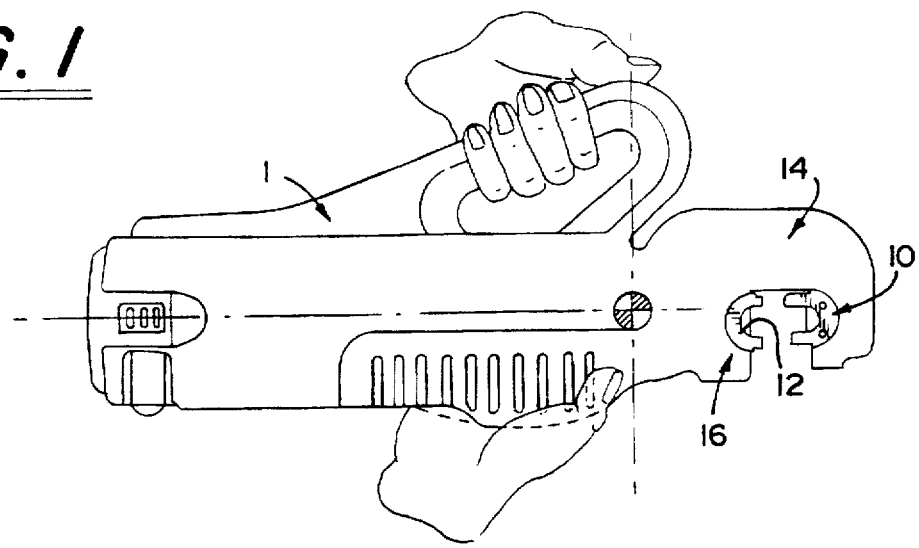
FIG. 1 is a side elevational view of a portable power crimping tool on which cutting die structures in accordance with the present invention have been installed.

Referring to FIG. 1, one embodiment of paired die structures 10 and 12 are shown installed on respective jaws 14 and 16 of a generally portable, crimping and cutting tool 1 which may be any of various typical designs commercially available, and particularly as more fully described in U.S. patent application Ser. No. 08/532,332, the text of which is incorporated by a reference herein. The general design of the crimping tool 1 is that there is provided a stationary jaw 14 and a moveable jaw portion 16. The movable jaw 16 is powered by an electro-hydraulic system to attain the desired crimp pressure or force, as is well known in the art.

Figure 2:
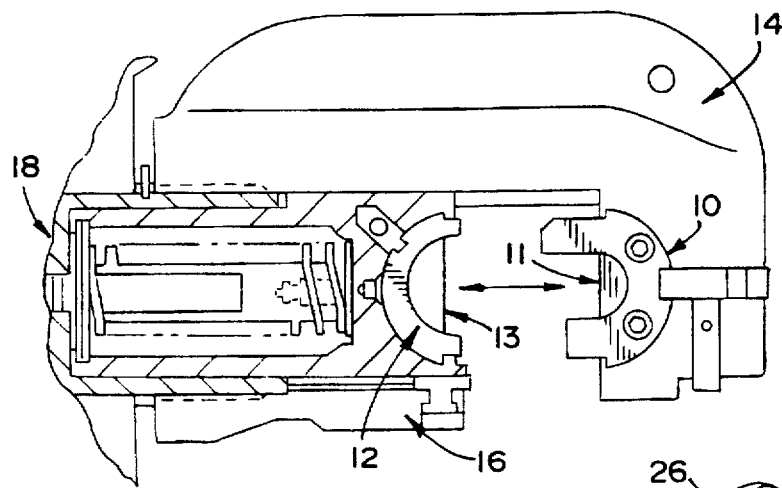
FIG. 2 is an enlarged, fragmentary view of the tool head in FIG. 1 showing enlarged view of the installed cutting die structures in a first embodiment according to the invention.
Figure 3:
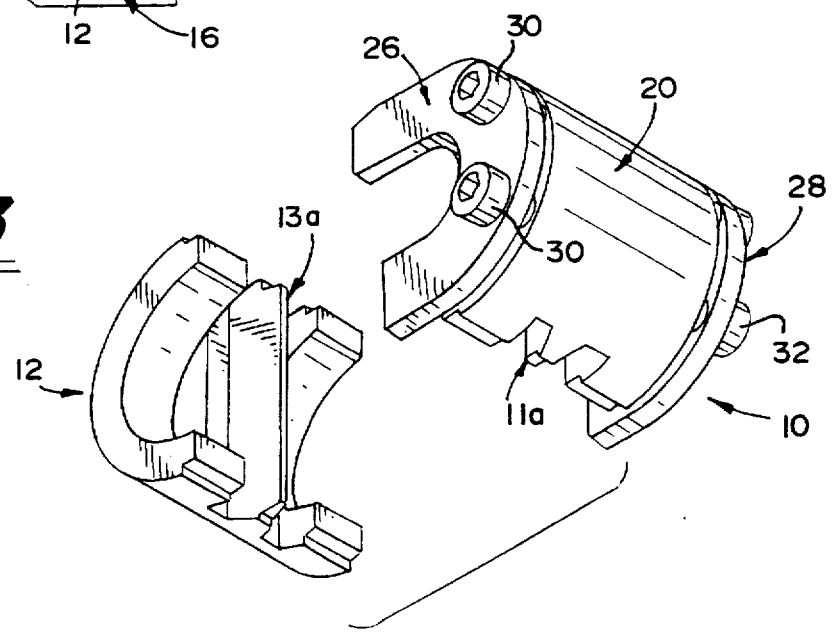
FIG. 3 is an enlarged, perspective view of the first embodiment of the die structures shown in FIGS. 1 and 2, removed from the tool head.

As shown in FIGS. 2 and 3, the paired dies 10 and 12 are installed on the jaws 14 and 16 with a conventional "Burndy-style" mounting securement (not shown) which is well known in the portable tool industry.

Figure 5:
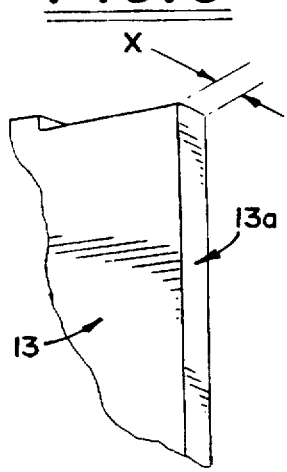
FIG. 5 is an enlarged, fragmentary perspective view of a cutting edge in accordance with the present invention on one of the die structures shown in FIGS. 1–4.

In the embodiment illustrated in FIGS. 1 and 2, the jaw 14 is maintained stationary while the jaw 16 is moveable toward or away from the jaw 14 and driven, for example, by a hydraulic ram assembly 18. Each of the dies 10 and 12 has a respective cutting edge 11 and 13 which are preferably heat treated for particularly cutting tough materials so that the edges 11,13 meet in a pinching action. The die cutting edges 11 and 13 preferably have narrowly truncated flat lead surfaces 11a and 13a which have width dimension X (FIG. 5), for example as small as 0.023 inch wide, in order to maintain durability when used to cut or fracture high tensile strength cable such as guy wire and steel reinforced aluminum cable or soft steel rods such as ground rod or rebar. The ram assembly 18 forces the moveable jaw 16 toward the stationary jaw 14 so that the cable or rod placed between the die structures 10 and 12 will be fractured, usually before the cutting edges 11 and 13 touch.

Figure 11:
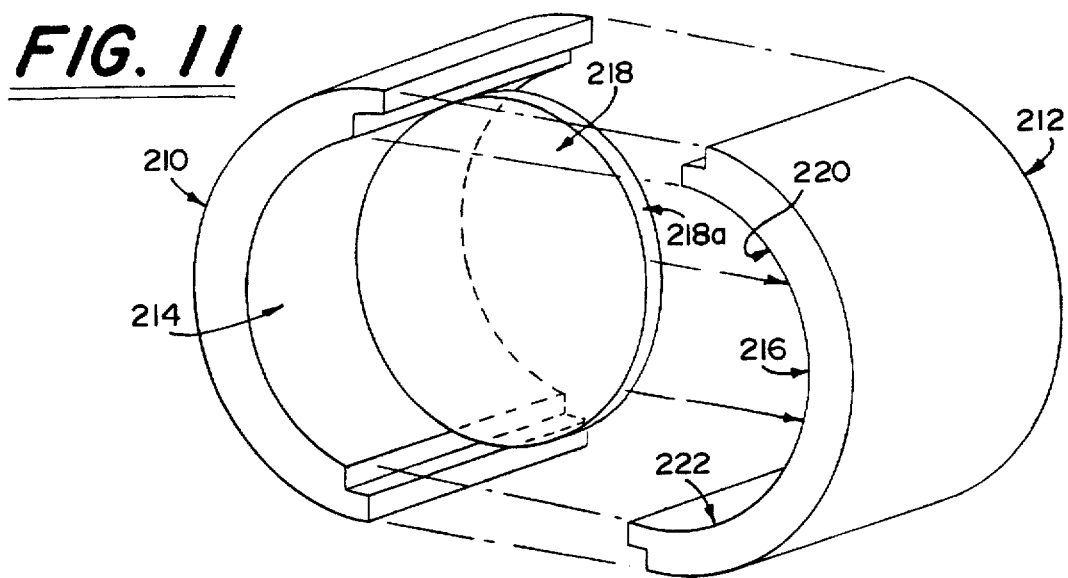
FIG. 11 is a perspective view of a third embodiment of die structures in accordance with the present invention.
Figure 12:
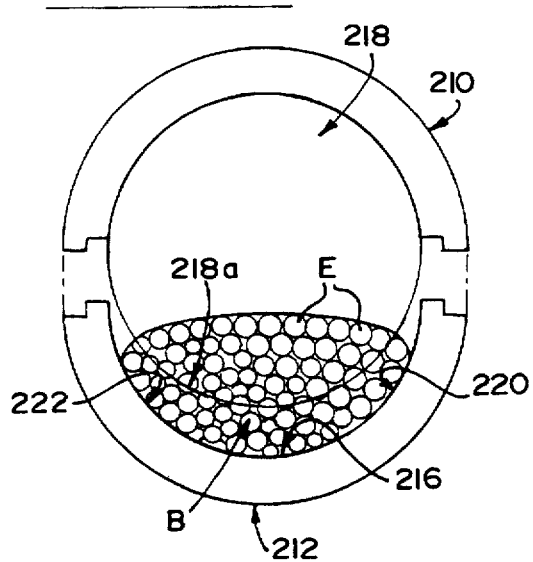
FIG. 12 is an end view of the die structures in FIG. 11, illustrating cutting operation and support of a multi-strand cable.

In the illustrated embodiment, the flat cutting edges 11 and 13 are generally linear; it is envisioned, however, that the dies may be of varying complimentary shapes such as curved or arcuate, with the cutting edge or edges being generally flat, but not linear or planer, as illustrated in FIGS. 11 and 12.

Figure 4:
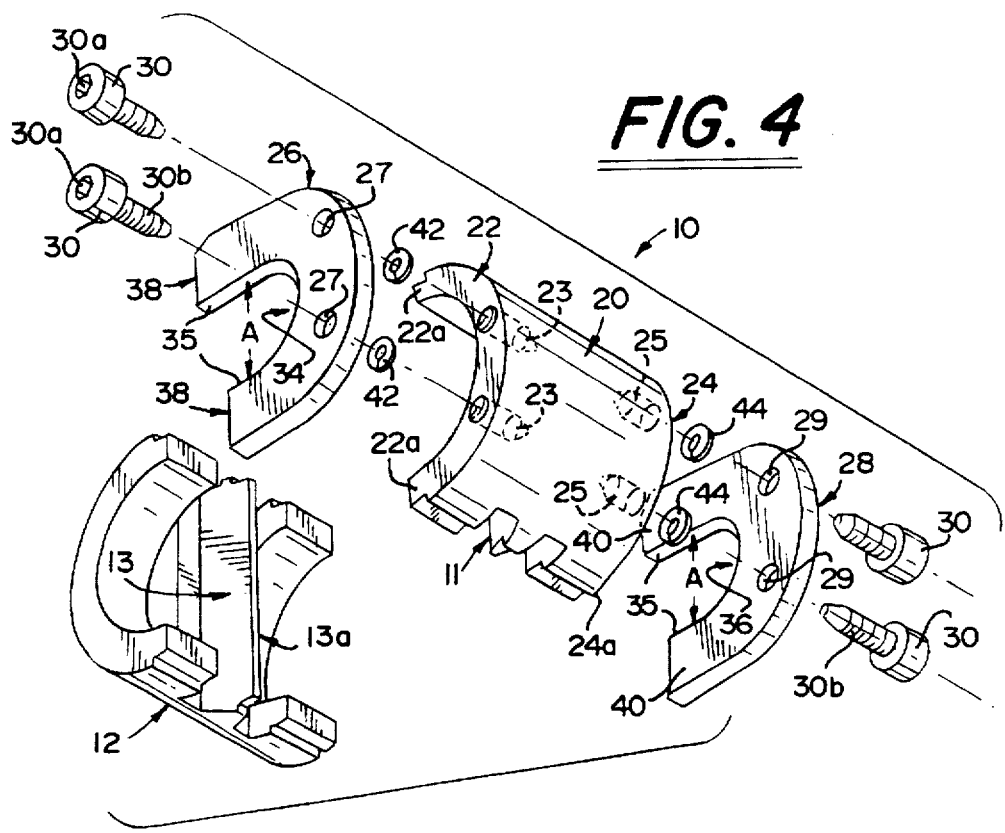
FIG. 4 is an exploded, perspective view of the die structures shown in FIG. 3.

Referring now particularly to FIGS. 3 and 4, the die structure 10 which is preferably installed in the socket of the stationary tool jaw 14 has a generally semi-cylindrical main body 20 from which the medially arranged cutting edge 11 extends generally diametrically and centrally spaced between the semi-annular end walls 22 and 24. Respective end plates 26 and 28 are fastened to the two end walls 22 and 24 with a respective pair of socket head cap screws 30 which also have tool-engagement recesses 30a. The bolt shafts 30b pass through respective plate apertures 27 and 29 and are threaded into threaded bores 23 and 25 in the respective end walls 22 and 24 of the die body 20.

In the illustrated embodiment, the end plates 26 and 28 have a U-shaped configuration with respective U-shaped open apertures 34 and 36 which have transverse dimensions A sized to center the diameter of the cable or bar being cut, and particularly sized to generally conform to the circumference of a multi-stranded cable, especially when the cable is non-encapsulated and without insulation.

Figure 7:
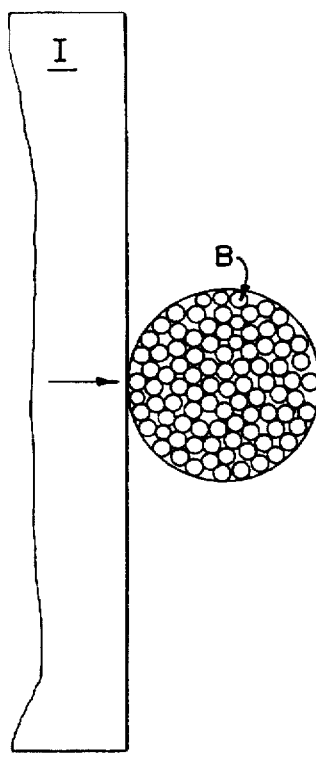
FIGS. 7–9 are generally diagrammatic views of cutting blades of conventional cutting dies according to the prior art illustrated the problems that result from the progressive spreading or splaying of a multi-strand cable shown in section during an attempted cutting operation.
Figure 8:
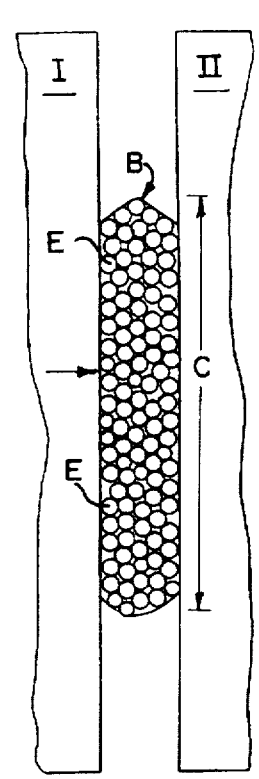
Figure 9:
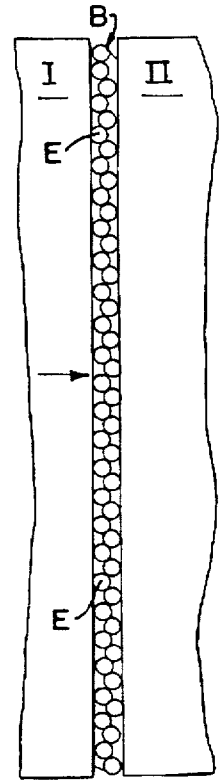
Figure 10:
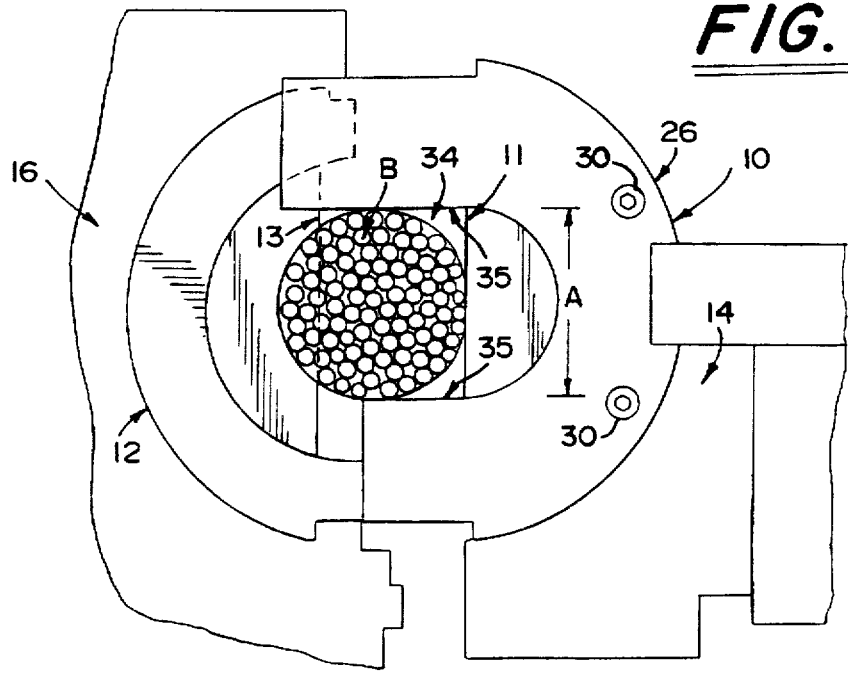
FIG. 10 is an enlarged, generally diagrammatic view of the cutting dies of the invention shown in FIGS. 1–5 and illustrating cutting operation of a multi-strand cable.

Referring to FIG. 10, when multi-stranded cable B is to be cut, the opposing walls 35 of the aperture 34 can be variably spaced in replaceable end plates 26 and 28 so that the aperture dimension A can be chosen to generally match the multi-strand cable B diameter. When the cable B is to be cut, the approaching cutting edges 11 and 13 tend to spread or splay the bundle of strands as the cutting edges impinge thereon; however, the suitably spaced aperture walls 35 provide retention to minimize or limit the degree of spread of the cable strands. Thus, as the cutting edges 11 and 13 engage the strands, the strands are cut or severed progressively. That is to say that due to the confinement of the strands of the bundle B, the maximum number of strands that would have to be severed by the dies is determined by the diameter of the opening 34. In contrast, with the prior art design, as illustrated in FIGS. 7–9, as the dies I and II engage an unconfined multi-strand cable B, the strands E will splay and spread, preventing any severing, during initial or intermediate engagement, FIGS. 7 and 8, respectively. Only upon reaching a conclusion, such as illustrated somewhat schematically in FIG. 9, will the dies I and II start to cut or sever the strands E. At this point in the process, the dies I and II must cut through all of the strands E simultaneously, thus increasing the force requirements to attain complete severance. With the present invention, the strands are cut progressively, which requires less force and achieves a cleaner cut.

Referring again to FIGS. 3 and 4, preferably, the projecting parallel legs 38 and 40 extend beyond the respective ends 22a and 24a of the die body end walls 22 and 24 in order to augment the retention of the multi-stranded cable, wire or rod within the respective plate apertures 34 and 36. Optionally, split-ring washers 42 and 44 can be provided between respective end wall 22 and end plate 26, and between the opposing end wall 24 and end plate 29, in order to enable shock-absorbing deflection of the end plates 26 and 28, particularly during cutting of multi-stranded cable. As an alternative to the split-ring washers 42 and 44, it would be possible to use elastomeric spacers which would provide greater shock absorbing qualities.

The moveable die structure 12 and flat cutting edge 13a, carried in ramdriven jaw 16 are generally mirror images of the die body 20, without end plates, of the die structure 10, although optionally retaining end wall plates can be provided on the die structure 12 similar to the plates 26 and 28 illustrated on the die structure 10, particularly for retention and reinforcement of the multi-strand cable during cutting. Typically the retaining end plates will be needed on only one of the dies 10 and 12, usually in the stationary jaw 14 where cable or other workpiece is seated for support to prepare for cutting movement of the moveable die and jaw 16.

Figure 6:
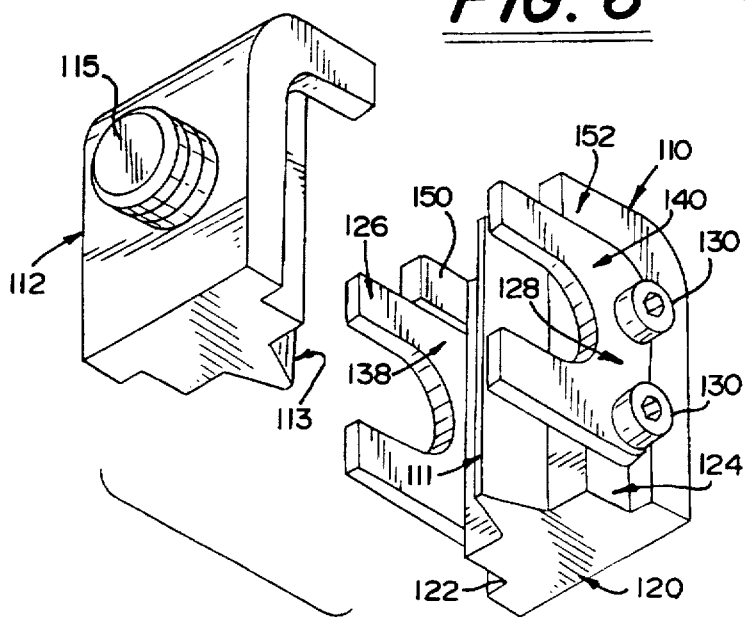
FIG. 6 is a perspective view of a second embodiment of die structures in accordance with the present invention.

Referring now to FIG. 6, a second embodiment of die structures in accordance with the present invention are shown in which the die structure 110 is adapted for a conventional "Kearney-style" configuration and mounting in the stationary tool jaw 14. The Kearney-style die body 120 has a generally block-shaped configuration which is accommodated in the mating socket (not shown) of the tool jaw 14. Each of the retaining plates (keepers) 126 and 128 have the same general configuration and function as the plates 26 and 28 of the first embodiment of die structure 10, however, in the illustrated embodiment, the die body 120 has laterally located exterior shoulders 122 and 124 on which the respective plates 126 and 128 are seated and fastened with bolts 130. Preferably, as shown in FIG. 6, the shoulders 122 and 124 extend into the projecting back walls 150 and 152 of the body 120 against which the respective legs 138 and 140 are abutted.

As in the first embodiment, the second die structure 112, typically carried in the moveable tool jaw and secured by mounting post, is generally a mirror image of die structure 110 without plates 126 and 128. The respective flat, elongate cutting edge surfaces 111 and 113 are aligned for pinching fracture of particularly high tensile strength workpiece material.

Figure 13:
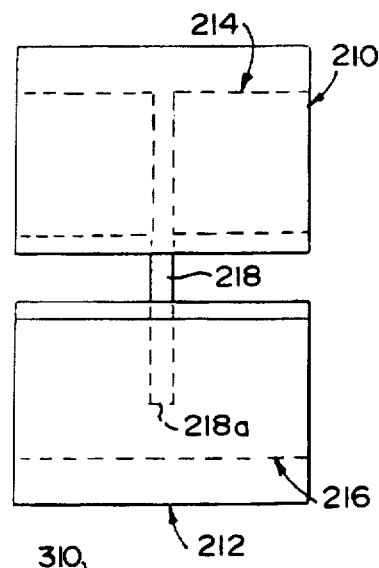
FIG. 13 is a plan view of the approaching die structures shown in FIG. 11.

Referring now to FIGS. 11–13, a third embodiment of die structures in accordance with the present invention are shown in which the die bodies 210 and 212 each have respective half-cylindrical cavities 214 and 216. The die body 210 has a cutting edge 218 which is arcuately shaped and projects transversely from a cylindrical surface of the cavity 214, and is provided with a flat leading edge 218a which is curved to have the appearance of a disk. The disk-like cutting edge 218 is received within the half-cylindrical cavity 216 of the opposing die body 212 during the impingement operation shown in FIG. 12.

Since the die body 212 does not have an impinging or cutting edge, a multi-strand cable B can be laid directly against the cylindrical surface of the cavity 216 so that when the leading, cutting edge 218a, on the preferably moveable die body 210, is driven to impinge the multi-strand cable B, the diametrically opposing cylindrical cavity walls 220 and 222 will laterally support the cable B to prevent or minimize any splaying of the strands E to enable the gradual and progressive cutting of the strands by the cutting edge 218a as shown in FIG. 12.

Figure 14:
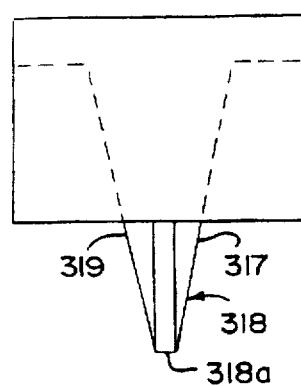
FIG. 14 is a top plan view of a modified die structure in accordance with the present invention.

Referring to FIG. 14, a further embodiment of the die body 310 has a modified cutting disk 318 which includes lateral side surfaces 317 and 319 which taper toward the arcuately projecting, flat cutting edge 318a, for improved durability of the disk 318.

In another embodiment, one of the die bodies has a half-cylindrical cavity for reception of a workpiece, and is not provided with an impinging or cutting edge so that the diametrically opposed cylindrical cavity walls provide lateral support particularly of a multi-strand cable which prevent or minimize splaying thereof during impingement by a single cutting edge which projects, preferably an arcuate configuration, from the other die body.

While preferred embodiments of the present invention are shown and described, it is envisioned that those skilled in the art may devise various modifications and equivalents without departing from the spirit and scope of the invention, as defined by the appended claims.

The invention claimed is:

1. A die structure for use in a crimping or cutting tool for impinging and deforming a workpiece between relatively moveable jaws of the tool on which the die structure is securable, comprising: die body including an impinging formation arranged to impinge and deform said workpiece against another, directly opposing impinging formation thereby crimping or cutting said workpiece; and a retaining structure removably secured on said die body adjacently spaced from said impinging formation on said die body and arranged to support said workpiece engageable thereagainst to prevent workpiece deformation thereat during said impingement by said impinging formation at an adjacent location on said workpiece.

2. A die structure according to claim 1, wherein said impinging formation comprises a cutting edge having a flat, elongate lead surface engageable against said workpiece.

3. A die structure according to claim 1, wherein said retaining structure comprises a pair of spaced support walls arranged with said impinging formation positioned therebetween in order to support said workpiece at opposing locations laterally positioned along said workpiece relative to intermediate position of said deformation by said impinging formation of the die body.

4. A die structure according to claim 3, wherein said support walls comprise respective opposing apertures arranged for reception of said workpiece inserted thereinto for said support.

5. A die structure according to claim 4, wherein said apertures are opposingly arranged for extension therethrough of said workpiece transverse to an elongate dimension of said impinging formation.

6. A die structure according to claim 3, wherein said support walls project in relative parallel extension from said die body.

7. A die structure according to claim 6, wherein said impinging formation comprises an elongate dimension arranged in parallel relation to said parallel extension of said support walls.

8. A die structure according to claim 3, wherein at least one of said support walls is removably fastened to said die body.

9. A die structure according to claim 3, wherein at least one of said support walls comprises a U-shaped plate including spaced, opposing legs extending from said die body and having an aperture dimensioned for reception of said workpiece between said legs.

10. A die structure according to claim 9, wherein a first of said legs extends relatively further from said die body than a second of said legs for engagement of said workpiece against said first leg to guide said workpiece into said die structure for said deformation operation.

11. A die structure according to claim 1, further comprising a deformable spacer element mounted between said retaining structure and said die body in order to enable deflectable motion of said retaining structure relative to said die body during deformation operation on said workpiece.

12. A die structure according to claim 11, wherein said spacer element comprises a split-ring through which a fastener shaft passes to fasten said retaining structure on said die body.

13. A die structure according to claim 2, wherein said retaining structure comprises a pair of spaced support walls laterally positioned in parallel relation aligned in parallel with said elongate cutting edge.

14. A die structure according to claim 13, wherein said support walls are removably fastened at opposing ends of said die body.

15. A die structure according to claim 14, further comprising a deformable spacer element mounted between said support wall and said respective end of said die body in order to allow deflection of said support wall relative to said die body during said deformation operation.

16. A die structure according to claim 2, in combination with a second die structure securable on an opposing one of said moveable tool jaws, said second die structure having an elongate cutting edge and flat leading surface thereof aligned parallel to said flat cutting surface of said first mentioned die body in order to provide pinching deformation of said workpiece between said aligned flat cutting surfaces.

17. A pair of die structures for use in a crimping or cutting tool for impinging and deforming or cutting a workpiece between relatively moveable jaws of the tool on which the die structures are opposingly securable, comprising:

a first die structure having a die body including an impinging formation arranged to impinge and deform or cut said workpiece against a directly opposing impinging structure on a second die structure;

said second die structure having a die body securable to an opposing one of said tool jaws; one of said first and second die structures including retaining structure removably arranged on said respective die body adjacently spaced from said respective impinging formation to support said workpiece engageable thereagainst to prevent workpiece deformation thereat during impingement by said impinging formations.

18. A pair of die structures according to claim 17, wherein said retaining structure comprises a pair of spaced support walls laterally positioned on said die body of said first die structure in relation to arrangement of said impinging formation adjacently located therebetween, said support walls arranged to support said workpiece engageable thereagainst to prevent said workpiece deformation.

19. A pair of die structures according to claim 18, wherein said support walls have respective U-shaped configurations and apertures formed between projecting legs of each said U-shaped configuration, said apertures arranged for receptive insertion of an elongate workpiece inserted thereinto for said support in deformation operation.

20. A pair of die structures according to claim 19, wherein said U-shaped support walls are removably fastened to said die body.

21. A pair of die structures according to claim 20, wherein at least one of said removable support walls is seated on an exterior shoulder formed on said die body to position said fastening thereto.

22. A pair of die structures according to claim 17, wherein said die body of said second die structure comprises a generally U-shaped cavity for reception and lateral support of said workpiece therein, defining said retaining structure.

23. A pair of die structures according to claim 22, wherein said U-shaped cavity is arranged without any impinging formation aligned with said impinging formation of said first die structure.

24. A pair of die structures according to claim 23, wherein said impinging formation of said first die structure comprises a generally arcuate configuration projecting from said respective die body.

25. A pair of die structures according to claim 24, wherein said arcuate configuration comprises a flat edge thereof transversely arranged relative to said arcuate configuration.

26. A pair of die structures according to claim 25, wherein said second die structure comprises a generally U-shaped cavity formed in said respective die body, said U-shaped cavity being arranged for reception therein of said arcuately configured impingement formation during said workpiece deformation thereby.

27. A die structure for use in a tool for crimping or cutting a workpiece between relatively moveable jaws of the tool on which the die structure is securable, comprising: a die body including an impinging formation arranged to impinge and deform said workpiece; and a retaining structure secured on said die body adjacently spaced from said impinging formation and arranged to support said workpiece engageable thereagainst to prevent workpiece deformation thereat during said impingement by said impinging formation at an adjacent location on said workpiece, wherein said retaining structure comprises a pair of spaced support walls arranged with said impinging formation positioned therebetween in order to support said workpiece at opposing locations laterally positioned along said workpiece relative to intermediate position of said deformation by said impinging formation of the die body, and wherein at least one of said support walls comprises a U-shaped plate including spaced, opposing legs extending from said die body and having an aperture dimensioned for reception of said workpiece between said legs.

28. A die structure according to claim 27, wherein a first of said legs extends relatively further from said die body than a second of said legs for engagement of said workpiece against said first leg to guide said workpiece into said die structure for said deformation operation.

29. A die structure for use in a tool for crimping or cutting a workpiece between relatively moveable jaws of the tool on which the die structure is securable, comprising: a die body including an impinging formation arranged to impinge and deform said workpiece; a retaining structure secured on said die body adjacently spaced from said impinging formation and arranged to support said workpiece engageable thereagainst to prevent workpiece deformation thereat during said impingement by said impinging formation at an adjacent location on said workpiece; and a deformable spacer element mounted between said retaining structure and said die body in order to enable deflectable motion of said retaining structure relative to said die body during deformation operation on said workpiece.

30. A die structure according to claim 29, wherein said spacer element comprises a split-ring through which a fastener shaft passes to fasten said retaining structure on said die body.

31. A die structure for use in a tool for crimping or cutting a workpiece between relatively moveable jaws of the tool on which the die structure is securable, comprising: a die body including an impinging formation arranged to impinge and deform said workpiece; a retaining structure secured on said die body adjacently spaced from said impinging formation and arranged to support said workpiece engageable thereagainst to prevent workpiece deformation thereat during said impingement by said impinging formation at an adjacent location on said workpiece, wherein said impinging formation comprises a cutting edge having a flat, elongate lead surface engageable against said workpiece, wherein said retaining structure comprises a pair of spaced support walls laterally positioned in parallel relation aligned in parallel with said elongate cutting edge, wherein said support walls are removably fastened at opposing ends of said die body; and a deformable spacer element mounted between said support wall and said respective end of said die body in order to allow deflection of said support wall relative to said die body during said deformation operation.

32. A pair of die structures for use in a tool for crimping or cutting a workpiece between relatively moveable jaws of the tool on which the die structures are opposingly securable, comprising:

a first die structure having a die body including an impinging formation arranged to impinge and deform or cut said workpiece; and a second die structure having a die body securable to an opposing one of said tool jaw, one of said first and second die structures including retaining structure arranged on said respective die body adjacently spaced from said impinging formation to support said workpiece engageable thereagainst to prevent workpiece deformation thereat during impingement by said impinging formation, wherein said retaining structure comprises a pair of spaced support walls laterally positioned on said die body of said first die structure in relation to arrangement of said impinging formation adjacently located therebetween, said support walls arranged to support said workpiece engageable thereagainst to prevent said workpiece deformation, wherein said support walls have respective U-shaped configurations and apertures formed between projecting legs of each said U-shaped configuration, said apertures arranged for receptive insertion of an elongate workpiece inserted thereinto for said support in deformation operation, wherein said U-shaped support walls are removably fastened to said die body, and wherein at least one of said removable support walls is seated on an exterior shoulder formed on said die body to position said fastening thereto.

* * * * *

UNITED STATES PATENT AND TRADEMARK OFFICE
CERTIFICATE OF CORRECTION

PATENT NO. : 5,775,158
DATED : July 7, 1998
INVENTOR(S) : Lyman J. Hensley, Neil H. Strawbridge, Jr. and Donald L. Shaner It is certified that error appears in the above-indentified patent and that said Letters Patent is hereby corrected as shown below:

On the title page item
[56],                REFERENCE CITED 3,036,798   "4/1962 Martin" should be
    3,036,798   -- 5/1962 Martin --

Signed and Sealed this

Fifth Day of January, 1999

Attest:

Attesting Officer

*Acting Commissioner of Patents and Trademarks*